(12) United States Patent
Nishida et al.

(10) Patent No.: US 9,030,041 B2
(45) Date of Patent: May 12, 2015

(54) ON-VEHICLE ELECTRONIC CONTROL APPARATUS

(75) Inventors: Mitsunori Nishida, Chiyoda-ku (JP); Tomohiro Kimura, Chiyoda-ku (JP); Masahide Fujita, Chiyoda-ku (JP); Yuji Zushi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 832 days.

(21) Appl. No.: 13/267,059

(22) Filed: Oct. 6, 2011

(65) Prior Publication Data
US 2012/0292988 A1    Nov. 22, 2012

(30) Foreign Application Priority Data

May 17, 2011  (JP) ................................. 2011-110276

(51) Int. Cl.
| | |
|---|---|
| *B60L 1/00* | (2006.01) |
| *B60R 16/03* | (2006.01) |
| *G06F 1/30* | (2006.01) |
| *G06F 1/32* | (2006.01) |

(52) U.S. Cl.
CPC . *B60R 16/03* (2013.01); *G06F 1/30* (2013.01); *G06F 1/3293* (2013.01)

(58) Field of Classification Search
CPC .......... B60R 16/03; G06F 1/30; G06F 1/3293

USPC ......................................................... 307/10.1
See application file for complete search history.

(56) References Cited

U.S. PATENT DOCUMENTS

| | | | |
|---|---|---|---|
| 2007/0057657 A1* | 3/2007 | Hashimoto et al. | 323/282 |
| 2008/0309163 A1* | 12/2008 | Hashimoto et al. | 307/31 |
| 2009/0316320 A1* | 12/2009 | Maeda et al. | 361/92 |

FOREIGN PATENT DOCUMENTS

| | | |
|---|---|---|
| JP | 10-098874 A | 4/1998 |
| JP | 11-265225 A | 9/1999 |
| JP | 2009-022152 A | 1/2009 |

* cited by examiner

*Primary Examiner* — Jared Fureman
*Assistant Examiner* — Joel Barnett
(74) *Attorney, Agent, or Firm* — Sughrue Mion, PLLC; Richard C. Turner

(57) ABSTRACT

A fourth constant-voltage power circuit directly powered from an on-vehicle battery is connected, in parallel through a serial resistor, to a second constant-voltage power circuit powered from the on-vehicle battery through an output contact of a power relay, and is connected to a drive power terminal of a microprocessor. When the output contact is closed, the microprocessor operates with an output voltage of the second constant-voltage power circuit, and an output current of the fourth constant-voltage power circuit is limited to less than or equal to a predetermined value by the serial resistor. During the operation stop at which a power switch is open, a micro standby current is supplied from the fourth constant-voltage power circuit to the microprocessor.

8 Claims, 4 Drawing Sheets

ON-VEHICLE ELECTRONIC CONTROL APPARATUS

BACKGROUND OF THE INVENTION

1. Field of the Invention

The present invention relates to an on-vehicle electronic control apparatus and, in particular, to an on-vehicle electronic control apparatus including a power circuit suitable to use a low power consumption type microprocessor having a standby open-circuit switch to supply a CPU drive current and a backup current for a RAM memory from a common power terminal.

2. Related Art

An on-vehicle electronic control apparatus is well known which includes plural constant-voltage power circuits in which a drive power voltage Vdd (e.g. DC 3.3 V) for an arithmetic circuit section cooperating with a non-volatile program memory or a volatile RAM memory is reduced compared to a power voltage Vcc (e.g. DC 5 V) for interface circuit, and a hold voltage Vup for battery backup is supplied to the RAM memory so that a microprocessor operates at a low power consumption and at a high speed.

For example, according to the following Patent Document 1, two types of DC 5 V power supplies that generate an output voltage Vad of high precision and small capacity for an analog sensor and an output voltage Vif of low precision and large capacity for on-off sensor are provided for an interface circuit with respect to a microprocessor, a DC 3.3 V power supply that generates an output voltage Vcp of low precision, low voltage and large capacity is provided for driving an arithmetic circuit section, a DC 3.3 V (or DC 2.8 V) power supply that generates an output voltage Vup of low precision, low voltage and micro capacity is provided for the backup of a RAM memory, and a DC 3.3 V power supply that generates an output voltage Vsb of low precision, low voltage and small capacity is provided for driving a combined control circuit section cooperating with the microprocessor.

Moreover, the constant-voltage power circuits that generate the output voltages Vad, Vif and Vcp are powered from an on-vehicle battery through an output contact of a power relay energized when a power switch is closed, the constant-voltage power circuit that generates the output voltage Vup is always powered from an on-vehicle battery regardless of an on-off operation of a power switch, and the constant-voltage power circuit that generates the output voltage Vsb is powered through an output contact of a power relay or is always powered from an on-vehicle battery according to the application thereof, so that the on-vehicle electronic control apparatus can detect failure of each constant-voltage power circuit as a whole.

PATENT DOCUMENT

[Patent Document 1] JP-A-2009-022152 (FIGS. 1 and 6)

In the on-vehicle electronic control apparatus according to Patent Document 1, when an output voltage Vup for memory backup is set to a lower output voltage than an output voltage Vcp, a higher current than an allowable current does not run through a constant-voltage power circuit for an output voltage Vup of micro capacity with a power switch closed even when output circuits of a constant-voltage power circuit for the output voltage Vcp and a constant-voltage power circuit for an output voltage Vup are simply connected in parallel through a diode circuit for power supply to the microprocessor. When a minimum hold voltage of a backup memory is a value close to a drive voltage of the microprocessor, however, the output voltage Vup and the output voltage Vcp are values close to each other; thus, when a fluctuation error is estimated, the output voltage Vup becomes higher than the output voltage Vcp. In this case, an excessive current may run through the constant-voltage power circuit for the output voltage Vup, thus causing burning. Intentionally increasing the output voltage Vcp compared with a minimum hold voltage of the backup memory solves such a problem; however, in this case, there is a drawback that the power consumption of the constant-voltage power circuit for the output voltage Vcp increases, the size is enlarged and the cost becomes higher.

SUMMARY OF THE INVENTION

The present invention is made to solve the foregoing problems, and it is an object of the present invention to provide an on-vehicle electronic control apparatus which includes a low power consumption type microprocessor supplying a CPU drive current and a backup current for a RAM memory from a common power terminal, including a power circuit that minimizes a CPU drive voltage to suppress power consumption of a constant-voltage power circuit and that prevents an excessive current from running through a constant-voltage power circuit for memory backup even when a voltage for memory backup becomes higher than a voltage for CPU drive.

In addition, it is another object of the present invention to provide an on-vehicle electronic control apparatus including a constant-voltage power circuit for CPU drive which avoids difficulties in accommodating fluctuations of wide-ranging power voltages and load currents, achieving reduction in the size and cost as a whole.

According to the present invention, there is provided an on-vehicle electronic control apparatus that includes a microprocessor for drivingly controlling an electrical load group in response to operating states of on-vehicle sensor groups and contents of a control program stored in a non-volatile program memory, and a constant-voltage power circuit powered from an on-vehicle battery and generating plural types of output voltages, wherein the microprocessor includes: an arithmetic circuit section cooperating with the non-volatile program memory; a volatile RAM memory with at least a partial region as a backup memory; an input/output interface circuit; and a standby open-circuit switch that cuts off a feeder circuit against circuits other than the backup memory at standby, wherein the constant-voltage power supply circuit includes first, second and fourth constant-voltage power circuits powered from the on-vehicle battery and supplying a stabilized output voltage to the microprocessor, the first constant-voltage power circuit is powered from the on-vehicle battery through an output contact of a power relay energized when a power switch is closed, and de-energized at an interval of a predetermined delay time when the power switch is opened, to generate a first output voltage Vif, the first output voltage Vif is applied to the input/output interface circuit, the second constant-voltage power circuit is powered from the on-vehicle battery through the output contact of at least the power relay to generate a second output voltage Vcp, the second output voltage Vcp is applied to the arithmetic circuit section provided in the microprocessor, the non-volatile program memory, the RAM memory, and the backup memory, and the fourth constant-voltage power circuit is directly powered from the on-vehicle battery to generate a fourth output voltage Vup and is connected with an output terminal of the second constant-voltage power circuit through a serial resistor.

According to the present invention, there is provided an on-vehicle electronic control apparatus which includes a low power consumption type microprocessor supplying a CPU drive current and a backup current for a RAM memory from a common power terminal, including a constant-voltage power circuit that minimizes a CPU drive voltage to suppress power consumption of a constant-voltage power circuit and that prevents an excessive current from running through the constant-voltage power circuit for memory backup even when a voltage for memory backup becomes higher than a voltage for CPU drive. In addition, there is provided an on-vehicle electronic control apparatus including a constant-voltage power circuit for CPU drive that avoids difficulties in accommodating fluctuations of wide-ranging power voltages and load currents, achieving reduction in the size and cost as a whole, and stable power supply to the microprocessor and the backup memory.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Figure 1:
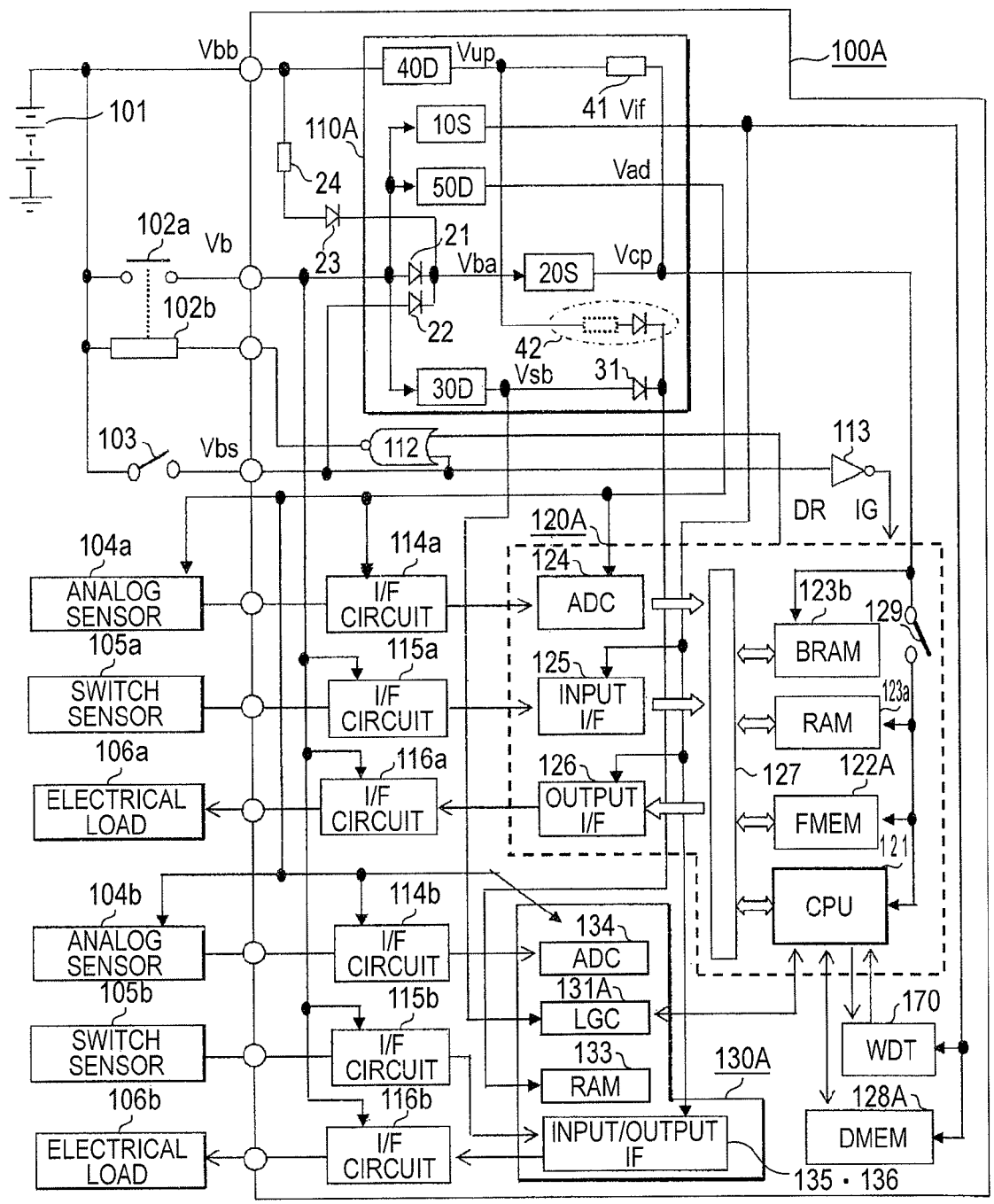
FIG. 1 is a total circuit block diagram of an on-vehicle electronic control apparatus according to Embodiment 1 of the present invention.

Embodiments of the present invention will now be described in detail with reference to the accompanying drawings. Note that like reference numerals refer to like parts throughout the figures, the description of which is omitted.

Embodiment 1

(1) Description of Configuration

FIG. 1 is a total circuit block diagram of an on-vehicle electronic control apparatus according to Embodiment 1 of the present invention. In FIG. 1, a main power voltage Vb is applied to an on-vehicle electronic control apparatus 100A through an output contact 102a of a power relay from an on-vehicle battery 101, and a hold power voltage Vbb is directly applied from the on-vehicle battery 101 even when the output contact 102a is open.

However, since a direct feeder uses a fine wire for micro power, there is a problem that running a high current causes a line voltage drop even in a temporary case. An exciting coil 102b of the power relay is controlled by the on-vehicle electronic control apparatus 100A so as to be energized when a power switch 103 is closed and to be de-energized at an interval of a predetermined delay time when the power switch 103 is opened. A first analog sensor 104a of an on-vehicle sensor group entered into the on-vehicle electronic control apparatus 100A includes an intake air amount sensor of an intake pipe, an exhaust gas sensor, an intake valve opening sensor and a depression amount sensor of an accelerator pedal, for example, and a second analog sensor 104b includes a cooling water temperature sensor and an air pressure sensor, for example; each of the analog sensors generates an operator command relative to a vehicle engine and a monitoring signal in a running state of the engine.

A first switch sensor 105a of an on-vehicle sensor group entered into the on-vehicle electronic control apparatus 100A includes an crank angle sensor of an engine, and a vehicle speed sensor, for example, and a second switch sensor 105b includes a selection position sensor of a transmission shift lever, for example; each of the switch sensors generates an operator command relative to the vehicle engine and a monitoring signal in a running state of the engine.

A first on-vehicle electrical load group 106a subject to power supply control from the on-vehicle electronic control apparatus 100A includes a solenoid valve for fuel injection, an ignition coil (in the case of a gasoline engine), and a motor for intake valve opening control, for example, and a second on-vehicle electrical load group 106b includes a solenoid valve for speed stage selection, an electrothermal heater for exhaust gas sensor, and a warning indication device, for example; each of the on-vehicle electrical load groups performs operation control relative to the vehicle engine and state notification.

A constant-voltage power circuit 110A built in the on-vehicle electronic control apparatus 100A generates a first output voltage Vif, a second output voltage Vcp, a third output voltage Vsb and a fifth output voltage Vad, which are mainly stabilized voltages stepped-down from a main power voltage Vb, and a fourth output voltage Vup, which is a stabilized voltage stepped down from a hold power voltage Vbb, as described later.

A first analog interface circuit 114a and a second analog interface circuit 114b are noise filter circuits connected between the first analog sensor 104a and the second analog sensor 104b and multi-channel A-D converters 124, 134, respectively, which will be described later. A first previous-stage input interface circuit 115a and a second previous-stage input interface circuit 115b are connected between the first switch sensor 105a and the second switch sensor 105b and input interface circuits 125, 135, respectively, which will be described later, and are composed of a conversion circuit of a signal voltage level and a noise filter circuit. A first subsequent-stage output interface circuit 116a and a second subsequent-stage output interface circuit 116b are connected between a first on-vehicle electrical load group 106a and the second on-vehicle electrical load group 106b and output interface circuits 126, 136, respectively, which will be described later, and are composed of a power transistor circuit for converting a signal voltage level.

Note that the first and second previous-stage input interface circuits 115a, 115b, and the first and second subsequent-stage output interface circuits 116a, 116b are powered from the main power voltage Vb.

A microprocessor 120A includes an arithmetic circuit section 121, a non-volatile program memory 122A, a RAM memory 123a for arithmetic processing, a backup memory 123b which is a partial region of the RAM memory, the multi-channel A-D converter 124, the input interface circuit 125 and the output interface circuit 126, which are connected with one another through a data bus 127.

A non-volatile data memory 128A is an electrically rewritable and readable non-volatile DMEM memory serial-connected with the arithmetic circuit section 121. The DMEM memory becomes unnecessary when the partial region in the non-volatile program memory 122A is used as a non-volatile data memory. A combined control circuit section 130A includes a monitoring control circuit section 131A configured in hard logic, an auxiliary RAM memory 133, the second multi-channel A-D converter 134, the input interface circuit 135 and an output interface 136. The combined control circuit section 130A is serial-connected with the arithmetic circuit section 121 through a series-parallel converter (not shown), and transmits a digital conversion value of the analog signal obtained from the second analog sensor 104b and an ON-OFF signal obtained from the second switch sensor 105b to the arithmetic circuit section 121 and drives the second on-vehicle electrical load group 106b by a control output signal generated by the arithmetic circuit section 121.

A logical OR inversion output circuit 112 serves as an output interface circuit for energizing the exciting coil 102b of the power relay when the power switch 103 is closed or when the microprocessor 120A generates a power supply hold command signal DR. Note that the power supply hold command signal DR may be replaced with a normal operation signal which is output by detection of a normal operating state by a watch dog timer circuit 170 that monitors an operating state of the arithmetic circuit section 121. An inversion input circuit 113 is an interface circuit for inputting a running monitor signal IG that obtains a logic level "L" when the power switch 103 is closed, into the microprocessor 120A. When the power switch 103 is closed, the exciting coil 102b is immediately energized through the logical OR inversion output circuit 112, the output contact 102a is closed and the microprocessor 120A starts the operation. When the microprocessor 120A generates a power supply hold command signal DR, energization of the power relay is continued even when the power switch 103 is opened, and when the microprocessor 120A performs retreat for running stop and then stops the power supply hold command signal DR, so that the power relay is de-energized.

The output voltage of the on-vehicle battery 101 varies from 8 V to 16 V for DC 12 V system; however, the first and second previous-stage input interface circuits 115a, 115b primary-convert an input voltage from a main power voltage Vb of the DC 12 V system to that of a DC 5 V system, and the input interface circuits 125, 135 further perform secondary conversion from the DC 5 V system to a DC 3.3 V system. The output interface circuits 126, 136 primary-convert the output voltage of the DC 3.3 V system to that of the DC 5 V system, and the first and second subsequent-stage output interface circuits 116a, 116b further perform secondary conversion from the DC 5 V system to the DC 12 V system. Operating the arithmetic circuit section 121 and various types of memories at a second output voltage Vcp=DC 3.3 V allows high-density packaging and high-speed processing of the microprocessor 120A. Similarly, operating the monitoring control circuit section 131A at a third output voltage Vsb=DC 3.3 V (or DC 2.5 V) allows high-density packaging and high-speed processing of the combined control circuit section 130A. However, when the second output voltage Vcp and the third output voltage Vsb are designed so as to achieve the same voltage and the same precision, it is not necessary to separate the second output voltage Vcp from the third output voltage Vsb.

A first constant-voltage power circuit 10S is powered from the on-vehicle battery 101 through the output contact 102a of the power relay to generate a first output voltage Vif. The first output voltage Vif is a power supply of low precision and large capacity of DC 5 V±0.2 V/200 mA, for example, and is applied to the input interface circuits 125, 135, the output interface circuits 126, 136, the non-volatile data memory 128A, and the watch dog timer circuit 170.

A second constant-voltage power circuit 20S is powered from a synthetic power voltage Vba composed by connecting, in parallel, a serial circuit of the output contact 102a of a power relay for supplying a main power voltage Vb and a feeder diode 21, a serial circuit of a power switch 103 for supplying an advance power voltage Vbs and an advance feeding diode 22 and a serial circuit of a hold feeder diode 23 for supplying a hold power voltage Vbb and a current limiting resistor 24, to generate a second output voltage Vcp.

The second output voltage Vcp is a power supply of low precision and large capacity of DC 3.3 V±0.3 V/500 mA, for example, and is applied to the arithmetic circuit section 121, the non-volatile program memory 122A, the RAM memory 123a and the backup memory 123b.

A third constant-voltage power circuit 30D is powered from the on-vehicle battery 101 through the output contact 102a of the power relay to generate a third output voltage Vsb, as in the same way as the first constant-voltage power circuit 10S. The third output voltage Vsb is a power supply of low precision and small capacity of DC 3.3 V±0.3 V/50 mA, for example, and is applied to the monitoring control circuit section 131A provided in the combined control circuit section 130A.

A fourth constant-voltage power circuit 40D is directly powered from the on-vehicle battery 101 to generate a fourth output voltage Vup. The fourth output voltage Vup is a power supply of low precision and small capacity of DC 3.3 V±0.3 V/20 mA, for example, and is supplied to the backup memory 123b through a serial resistor 41 when the output contact 102a of the power relay is open.

An auxiliary RAM memory 133 in the combined control circuit section 130A is powered from the third constant-voltage power circuit 30D through a parallel feeder diode 31 and is powered from the fourth constant-voltage power circuit 40D through an auxiliary feeder circuit 42 that is a diode or a resistive element.

In the case that the auxiliary feeder circuit 42 is a diode, a feeder line relative to the fourth constant-voltage power circuit 40D is broken and grounded during vehicle running, and a switching element 400 in FIG. 2, which will be described later, is reversely conducted, thereby preventing stopping of power supply to the auxiliary RAM memory 133 and overload on the third constant-voltage power circuit 30D.

When the auxiliary feeder circuit 42 is an equivalent serial resistor to the serial resistor 41, the overload on the third constant-voltage power circuit 30D is suppressed, thus maintaining an operating state of the auxiliary RAM memory 133. A fifth constant-voltage power circuit 50D is powered from the on-vehicle battery 101 through the output contact 102a of the power relay to generate a fifth output voltage Vad.

The fifth output voltage Vad is a power supply of high precision and small capacity of DC 5 V±20 mV/20 mA, for example, and is powered to a part of the first and second multi-channel A-D converters 124, 134, the first and second analog interface circuits 114a, 114b, and the first and second analog sensors 104a, 104b.

Figure 2:
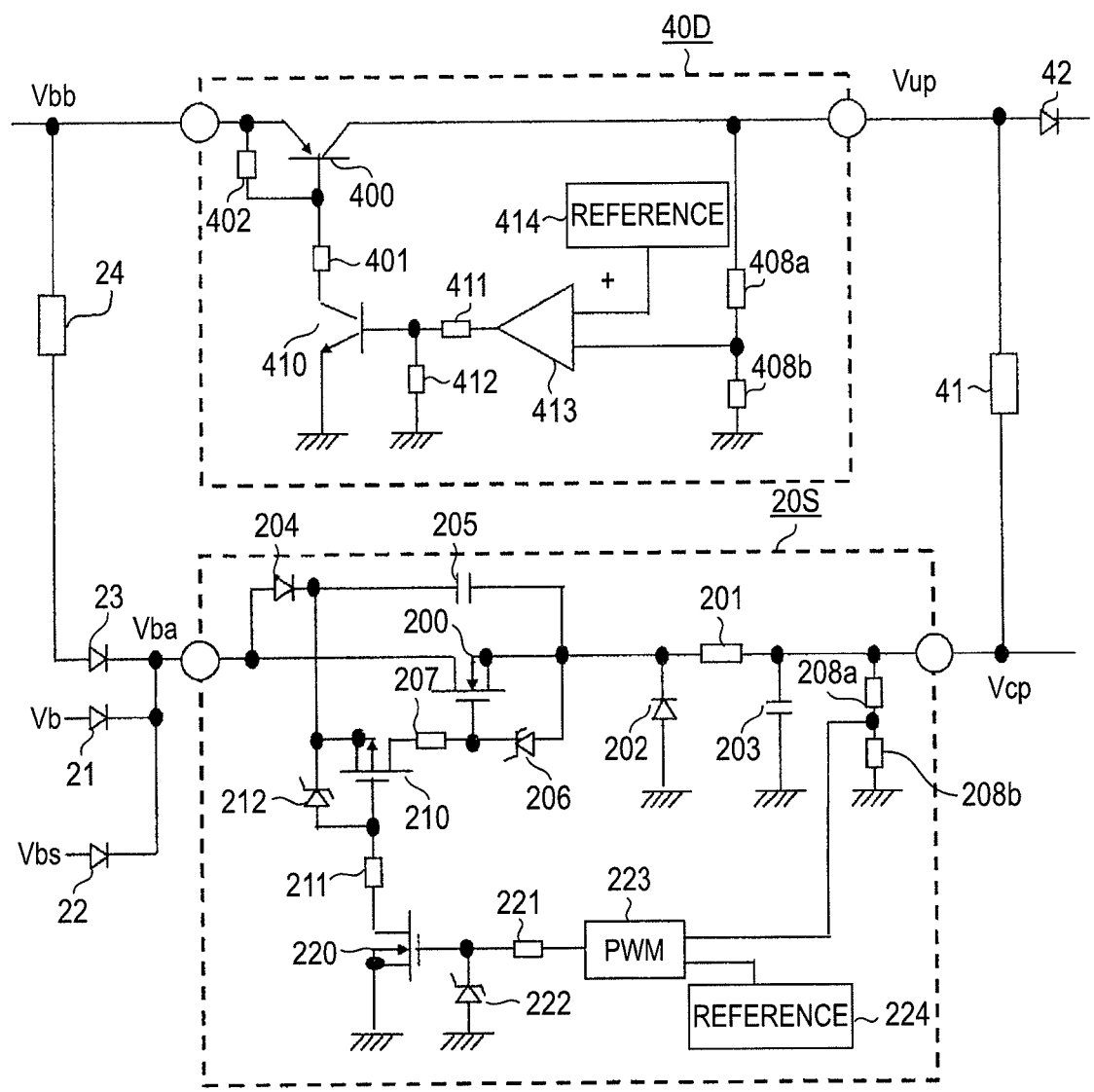
FIG. 2 is a detailed circuit diagram of a partial constant-voltage power circuit according to Embodiment 1 of the present invention.

Referring next to FIG. 2, the detailed circuit of the second constant-voltage power circuit 20S and the fourth constant-voltage power circuit 40D in FIG. 1 will be described below.

In FIG. 2, the second constant-voltage power circuit 20S that operates with a synthetic power voltage Vba obtained from the feeder diode 21, the advance feeder diode 22 and the hold feeder diode 23 as an input voltage, includes a switching element 200, which is an N-MOS-type field effect transistor, for example. The synthetic power voltage Vba is applied to a drain terminal of the switching element 200, and a source terminal thereof is connected to an output terminal generating the second output voltage Vcp through a chalk coil 201.

Note that, on the upstream side of the chalk coil 201, a freewheeling diode 202 is connected between a ground circuit and the diode, and, on the downstream side of the chalk coil 201, a power capacitor 203 is connected between the ground circuit and the chalk coil. A serial circuit of a charge diode 204 and a boost capacitor 205 is connected in parallel between the drain terminal and the source terminal of the switching element 200, and a voltage limiting diode 206 is connected in parallel between the gate terminal and the source terminal of the switching element 200.

In the charge voltage of the boost capacitor 205 charged through the charge diode 204 when the switching element 200 is open, with an intermediate-stage transistor 210 which is, for example, a P-MOS type field effect transistor being connected to the gate terminal of the switching element 200 through the drive resistor 207, when the intermediate-stage transistor 210 conducts, the switching element 200 also conducts, an output voltage is generated through the chalk coil 201, and the output voltage is monitored by voltage dividing resistors 208a, 208b. The gate terminal of the intermediate-stage transistor 210 is connected to a ground circuit through a drive resistor 211 and a primary-stage transistor 220 that is an N-MOS type field effect transistor and, when the primary-stage transistor 220 conducts, the intermediate-stage transistor 210 also conducts.

Note that a voltage limiting diode 212 is connected between the source terminal and the gate terminal of the intermediate-stage transistor 210, and a voltage limiting diode 222 is connected between the source terminal and the gate terminal of the primary-stage transistor 220. The output voltage of a pulse duration modulation control circuit 223 is applied to the gate terminal of the primary-stage transistor 220 through a drive resistor 221.

The pulse duration modulation control circuit 223 generates a pulse output of a fixed period in response to a deviation integral value between a reference voltage 224 generated by a band gap cell and a voltage in proportion to the second output voltage Vcp by voltage dividing resistors 208a, 208b, for example, and performs on-off control so that a conduction period of the primary-stage transistor 220 is increased when the second output voltage Vcp is lower than a predetermined voltage or the conduction period of the primary-stage transistor 220 is decreased when the second output voltage Vcp is higher than the predetermined voltage. When the primary-stage transistor 220 conducts and then the switching element 200 conducts, the power capacitor 203 is charged through the chalk coil 20. When the primary-stage transistor 220 becomes non-conducting and then the switching element 200 becomes non-conducting, the current running through the chalk coil 201 is discharged to the power capacitor 203 through the freewheeling diode 202, and the boost capacitor 205 is charged by the synthetic power voltage Vba, so that the next closed-circuit driving charges are accumulated.

The fourth constant-voltage power circuit 40D to which the hold power voltage Vbb is applied includes a switching element 400 that is a PNP type junction transistor, for example. The hold power voltage Vbb is applied to an emitter terminal of the switching element 400 and a collector terminal thereof is connected to an output terminal generating a fourth output voltage Vup and connected to an output terminal of the second constant-voltage power circuit 20S through the serial resistor 41.

A base terminal of the switching element 400 is connected to a ground circuit through a serial circuit of the drive resistor 401 and a previous-stage transistor 410 that is an NPN type junction transistor, for example. Moreover, an open-circuit ballast resistor 402 is connected between the emitter terminal and the base terminal, and voltage dividing resistors 408a, 408b are connected in series between the collector terminal and the ground circuit to monitor a fourth output voltage Vup. An open-circuit ballast resistor 412 is connected between the base terminal and the emitter terminal of the previous-stage transistor 410, and an output voltage of a comparison amplifier 413 is applied to the base terminal through a drive resistor 411.

The comparison amplifier 413 generates an analog signal voltage in response to a deviation integral value between a reference voltage 414 generated by a band gap cell and a voltage in proportion to the fourth output voltage Vup by voltage dividing resistors 408a, 408b, for example, and performs linearly control of a conduction state so that a base current of the previous-stage transistor 410 is increased when the fourth output voltage Vup is lower than a predetermined voltage or the base current of the previous-stage transistor 410 is decreased when the fourth output voltage Vup is higher than the predetermined voltage.

(2) Description of Action and Operation

Next, the action and operation of the on-vehicle electronic control apparatus 100A configured as shown in FIGS. 1 and 2 will be described in detail.

First, the outline of the whole control operation is as follows: when the power switch 103 is closed, the exciting coil 102b of the power relay is energized through the logical OR inversion output circuit 112, the output contact 102a is closed, and a main power voltage Vb is applied from the on-vehicle battery 101. The constant-voltage power circuit 110A generates first to third output voltages and a fifth output voltage in addition to a fourth output voltage, so that the arithmetic circuit section 121 and the combined control circuit section 130A start to operate. The arithmetic circuit section 121 generates a control output signal in response to operating states of the first and second analog sensors 104a, 104b and the first and second switch sensors 105a, 105b, which are among the on-vehicle sensor group, as well as a control program stored in the non-volatile program memory 122A to drivingly control the first and second on-vehicle electrical load groups 106a, 106b. The combined control circuit section 130A transmits operating states of the second analog sensor 104b and the second switch sensor 105b to the microprocessor 120A as monitor signals, and receives a control signal generated by the microprocessor 120A to drive the second on-vehicle electrical load group 106b. As actual situations, the combined control circuit section 130A also has a function of monitoring the operating state of the microprocessor 120A.

Various types of failure occurrence information occurring during the operation of the arithmetic circuit section 121 and learning storage information are stored in the backup memory 123b. The backup memory 123b retains storage contents by the fourth output voltage Vup obtained by stepping down a hold power voltage Vbb even when the output contact 102a of the power relay is open. The important information stored in the auxiliary RAM memory 133 of the combined control circuit section 130A is transferred to the backup memory 123b on the microprocessor 120A side during the operation, and usually the battery backup for the auxiliary RAM memory 133 is not required. However, when battery backup is required for flag information immediately before operation stop, for example, powering from the fourth constant-voltage power circuit 40D is possible through the auxiliary feeder circuit 42 that is a diode or a resistive element.

In the event that the on-vehicle battery 101 has an excessive voltage drop or the output terminal is opened for replacement, the storage information in the backup memory 123b and the auxiliary RAM memory 133 disappears; therefore, when the power switch 103 is opened, a part of important data stored in the backup memory 123b is stored in the non-volatile data memory 128A during a delayed feeding period until the output contact 102a of the power relay is opened.

The sharing of roles of the second and fourth constant-voltage power circuits 20S, 40D, roles of the serial resistor 41, and the sharing of roles of the feeder diode 21, the advance feeder diode 22, the hold feeder diode 23, and the current limiting resistor 24 will be described in detail below. First, when the power switch 103 is open, the power relay is de-energized and the output contact 102a thereof is open, the first, third and fifth constant-voltage power circuits 10S, 30D, 50D stop the operation, and any of the first, third and fifth output voltages Vif, Vsb, Vad does not occur. As the result, a standby open-circuit switch 129 is in an open-circuit state, and the microprocessor 120A is under such a good state that a hold current Ih appropriate to maintain an operating state of the backup memory 123b, for example, approximately 1 mA is supplied. The fourth constant-voltage power circuit 40D generates the fourth output voltage Vup of DC 3.3 V±0.3 V, for example, and supplies power to the backup memory 123b through the serial resistor 41 of a resistance value R41=100Ω, for example. Accordingly, even when the hold feeder voltage Vbb drops to a minimum assured voltage Vbmin=4.3 V, for example, due to an excessive voltage drop of the on-vehicle battery 101, a minimum hold voltage Vkp (for example, DC 2.5 V) of the backup memory 123b can be ensured.

On the other hand, to the second constant-voltage power circuit 20S, the hold power voltage Vbb is applied through the current limiting resistor 24 of a resistor R24=100Ω and the hold feeder diode 23; however, when the output voltage of the on-vehicle battery 101 excessively drops, the switching element 200 in FIG. 2 is difficult to be closed and a hold current Ih cannot be supplied to the backup memory 123b. When the power voltage of the on-vehicle battery 101 is at a normal low-voltage level of DC 8.0 V or higher, for example, the second constant-voltage power circuit 20S also operates properly and supplies power to the backup memory 123b in cooperation with the second and fourth constant-voltage power circuits 20S, 40D; however, this is actually not expected to obtain an output of the second constant-voltage power circuit 20S. It is the role of the hold feeder diode 23 to maintain the second constant-voltage power circuit 20S in an operating state. Therefore, the fourth constant-voltage power circuit 40D retains storage information of the backup memory 123b even when the output voltage of the on-vehicle battery 101 is an excessive lower voltage than a normal minimum voltage.

Next, immediately after the power switch 103 is closed, first, the advance feeder diode 22 supplies power to the second constant-voltage power circuit 20S; however, the second constant-voltage power circuit 20S is under the operation by the hold feeder diode 23, and the advance feeder diode 22 is usually unnecessary. However, in the event that a direct feeder line from the on-vehicle battery 101 is broken or hold power supply is not performed due to failed contact of an input terminal of the hold power voltage Vbb, before the output contact 102a of the power relay is closed and the first and fifth constant-voltage power circuits 10S, 50D generate the first and fifth output voltages Vif, Vad, the second constant-voltage power circuit 20S generates the second output voltage Vcp to prevent the microprocessor 120A from malfunctioning.

When the power switch 103 is closed and the output contact 102a of the power relay is closed, the first, third and fifth output voltages Vif, Vsb, Vad are generated, and, as a result of generation of the first output voltage Vif, the standby open-circuit switch 129 is closed. As the result, the output current of the second constant-voltage power circuit 20S rapidly increases to 300 mA, for example; however, since the output contact 102a is closed before the output current rapidly increases, the current running through the current limiting resistor 24 is a micro value obtained by dividing a voltage deviation based on a difference in a voltage drop of the feeder line by a resistance value R24 of the current limiting resistor 24.

When a maximum differential value ΔVmax (for example, 3.6−3.0=0.6 V) develops between a variation maximum (for example, 3.3+0.3=3.6 V) of the fourth output voltage Vup and a variation minimum (for example, 3.3−0.3=3.0 V) of the second output voltage Vcp, the current running through the fourth constant-voltage power circuit 40D becomes ΔVmax/R41, where R41 is a resistance value of a serial resistor 41. When this is 0.1 KΩ, for example, the maximum current becomes 0.6 V/0.1 KΩ=6 mA, for example. Thus, it is sufficient when an allowable output current Imax of the fourth constant-voltage power circuit 40D is, at most, 10 mA.

Next, immediately after the power switch 103 is opened, the exciting coil 102b of the power relay maintains an energizing state with a power hold command signal DR generated by the microprocessor 120A and the logical OR inversion output circuit 112. A part of the data stored in the backup memory 123b is transferred and stored in the non-volatile data memory 128A and successively when the microprocessor 120A stops the operation, the standby open-circuit switch 129 is opened, the power hold command signal DR stops, and the power relay is de-energized. When the output contact 102a of the power relay is opened, the first, third and fifth constant-voltage power circuits 10S, 30D, 50D stop the operation; however, for the second constant-voltage power circuit 20S, power supply is continued by the current limiting resistor 24 and the hold feeder diode 23.

However, since the standby open-circuit switch 129 has already been opened, the current running through the current limiting resistor 24 is minor.

In FIG. 2 showing a concrete circuit configuration of the second and fourth constant-voltage power circuits 20S, 40D, the second constant-voltage power circuit 20S is an on-off control type constant-voltage power circuit using an N-MOS type field effect transistor, generates a second constant-voltage output Vcp against wide-ranging power voltage fluctuations and provides low loss against low precision and high-current load. A P-MOS type field effect transistor or a PNP junction type transistor may be used as the switching element 200, thereby eliminating a boost capacitor for gate driving and achieving a simple circuit configuration.

The fourth constant-voltage power circuit 40D is a linear control type constant-voltage power circuit using a PNP junction type transistor, thus achieving a small-sized and low-cost configuration as a light-load constant-voltage power circuit, and achieving a highly precise constant-voltage output because of no ripple fluctuations accompanied with on-off control. However, power supply to the backup memory 123b requires no particular high-precision output voltage, and the P-MOS type field effect transistor may be used as the switching element 400.

(3) Features of Embodiment 1

As obvious from the above description, the on-vehicle electronic control apparatus according to Embodiment 1 of the present invention has the following features:

The on-vehicle electronic control apparatus according to Embodiment 1 of the present invention includes: the microprocessor 120A that drivingly controls the on-vehicle electrical load group 106a in response to operating states of the on-vehicle sensor groups 104a, 105a and the contents of a control program stored in the non-volatile program memory 122A, and the constant-voltage power circuit 110A powered from the on-vehicle battery 101 and generating plural types of stabilized output voltages, wherein the microprocessor 120A includes the arithmetic circuit section 121 cooperating with the non-volatile program memory 122A; volatile RAM memories 123a, 123b with at least a partial region as the backup memory 123b; input/output interface circuits 125, 126; and a standby open-circuit switch 129 that cuts off a feeder circuit against circuits other than the backup memory 123b at standby, and the constant-voltage power circuit 110A includes first, second and fourth constant-voltage power circuits powered from the on-vehicle battery 101 and supplying a stabilized output voltage to the microprocessor 120A.

The first constant-voltage power circuit 10S is powered from the on-vehicle battery 101 through the output contact 102a of the power relay energized when the power switch 103 is closed, and de-energized at an interval of a predetermined delay time when the power switch is opened, so as to generate the first output voltage Vif. The first output voltage Vif is applied to the input/output interface circuits 125, 126. The second constant-voltage power circuit 20S is powered from the on-vehicle battery 101 through the output contact 102a of at least the power relay to generate a second output voltage Vcp. The second output voltage Vcp is applied to the arithmetic circuit section 121 provided in the microprocessor 120A, the non-volatile program memory 122A, the RAM memory 123a and a backup memory 123b. The fourth constant-voltage power circuit 40D is directly powered from the on-vehicle battery 101 to generate the fourth output voltage Vup and is connected with an output terminal of the second constant-voltage power circuit 20S through the serial resistor 41.

That is to say, the on-vehicle electronic control apparatus according to Embodiment 1 uses the microprocessor capable of supplying power to only the backup memory that is a partial region of a RAM memory by opening the standby open-circuit switch at operation stop and capable of supplying power to all regions of the arithmetic open-circuit section, the non-volatile program memory and the RAM memory when the standby open-circuit switch is closed, and includes plural constant-voltage power circuits powered from the on-vehicle battery to generate a stabilized output voltage. To the input/output interface circuits of the microprocessor, an output voltage of the first constant-voltage power circuit powered from the on-vehicle battery when the power switch is closed is applied. To the drive power terminal of the microprocessor, the second constant-voltage power circuit powered from the on-vehicle battery when at least the power switch is closed and the fourth constant-voltage power circuit powered from the on-vehicle battery regardless of a state of the power switch are connected in parallel through the serial resistor.

Accordingly, during the operation with the power switch closed, the microprocessor is powered mainly by the second constant-voltage power circuit, and the output current of the fourth constant-voltage power circuit is suppressed by the serial resistor to prevent burning of the fourth constant-voltage power circuit of small capacity. During the operation, the fourth constant-voltage power circuit shares the function to singly supply power to the backup memory. Accordingly, the second constant-voltage power circuit does not need to singly accommodate wide-ranging voltage fluctuations and wide-ranging output current fluctuations, thus achieving an inexpensive configuration of a constant-voltage power circuit as a whole.

In the case that the second constant-voltage power circuit is directly powered from the on-vehicle battery, and the fourth constant-voltage power circuit is eliminated, there is a problem that the second constant-voltage power circuit requires control of heavy current during running and micro current during stopping, thus causing difficult stable supply of micro current.

Particularly, in use of a switching power supply of a type of controlling the current-carrying duty of the switching element as the second constant-voltage power circuit, a stable micro current cannot be energized; however, this problem can be overcome by concurrently using the fourth constant-voltage power circuit, thus achieving an advantage of providing stable power supply to the microprocessor with size and cost reductions as a whole.

Moreover, in use of a linear control type power supply of continuously controlling a conduction state of the switching element as the second constant-voltage power circuit, addition of a low-voltage cut-off function so as not to perform wasteful power supply in a low-voltage region where the microprocessor becomes inoperative may pose the same problem. Even when the microprocessor is inoperative, the power supply to the backup memory becomes impossible in a power voltage region which enables storage and holding of the backup memory. However, this problem can be overcome by concurrently using the fourth constant-voltage power circuit, thus achieving an advantage of providing stable power supply to the microprocessor and the backup memory with size and cost reductions as a whole.

In addition, in the on-vehicle electronic control apparatus according to Embodiment 1, the resistance value R of the serial resistor 41 is defined as follows: when the generated voltage of the on-vehicle battery 101 is higher than or equal to a minimum assured voltage Vbmin≥Vup+Vd corresponding to a value obtained by adding a minimum voltage drop Vd of the fourth constant-voltage power circuit 40D to the fourth output voltage Vup even when the power switch 103 is opened and outputs of the first and second output voltages Vif, Vcp stop, an output voltage of higher than or equal to the minimum hold voltage Vkp of the backup memory is applied to the backup memory 123b from the fourth constant-voltage power circuit 40D, and a value of less than or equal to (Vup−Vkp)/Ikp is selected so that a current of higher than or equal to a predetermined hold current Ikp is supplied. When the first and second output voltages Vif, Vcp develop with the power switch 103 closed and the standby open-circuit switch 129 is closed, a resistance value R of the serial resistor 41 is set at a value higher than or equal to ΔVmax/Imax so that an output current generated by the fourth constant-voltage power circuit 40D is less than or equal to a predetermined allowable current Imax through the serial resistor 41 when a maximum differential value ΔVmax occurs between a fluctuation maximum of the fourth output voltage Vup generated by the fourth constant-voltage power circuit 40D and a fluctuation minimum of the second output voltage Vcp.

That is to say, in the serial resistance connected to the fourth constant-voltage power circuit, when the standby open-circuit switch is opened and the fourth output voltage Vup supplies power to the backup memory, an upper limit is regulated so that a predetermined hold current is supplied. When the standby open-circuit switch is closed and power supply is performed in parallel to the second constant-voltage power circuit, a lower limit is regulated so that an upper limit of the current shunted to the fourth constant-voltage power circuit is less than or equal to the allowable current of the fourth constant-voltage power circuit.

Accordingly, even when the second and fourth output voltages approach each other and the current shunted to the fourth constant-voltage power circuit is generated by fluctuations in the output voltages, this can be suppressed to prevent burning of the fourth constant-voltage power circuit. The second output voltage can be suppressed to suppress the consumption of the second constant-voltage power circuit. Since no shunting occurs to the fourth constant-voltage power circuit by setting the second output voltage at a value higher than the fourth output voltage, no serial resistor is required to be provided; however, in this case, there is a problem that the power consumption of the second constant-voltage power circuit increases and a temperature rise in the microprocessor becomes higher.

In the on-vehicle electronic control apparatus according to Embodiment 1, the second constant-voltage power circuit 20S is powered from the on-vehicle battery 101 through the output contact 102a and the feeder diode 21 and is directly powered from the on-vehicle battery 101 through the hold feeder diode 23; therefore, even when the output contact 102a is opened, the power supply to an input circuit section of the second constant-voltage power circuit 20S is continued.

That is to say, the second constant-voltage power circuit is directly powered from the on-vehicle battery through the hold feeder diode even when the power switch is opened.

Accordingly, power supply to the microprocessor is performed with the second constant-voltage power circuit as a main subject until the standby open-circuit switch is opened. Even when the standby open-circuit switch is opened, the second constant-voltage power circuit continues to operate; however, even when the operation is continued, the standby open-circuit switch is opened and becomes a light load, thus suppressing discharge current of the on-vehicle battery. On the other hand, even when a power voltage drop causes the second constant-voltage power circuit to have no generation capability of a micro current, a micro current is supplied from the fourth constant-voltage power circuit to the backup memory to ensure the retention of storage information in the backup memory.

In addition, the hold feeder diode always supplies power to an input section of the second constant-voltage power circuit, so that no problem occurs with a rise delay of the second output voltage immediately after the output contact of the power relay is closed, thus preventing malfunction from occurring in the microprocessor due to advanced generation of the first output voltage.

In the on-vehicle electronic control apparatus according to Embodiment 1, the current limiting resistor 24 is connected in series with the hold feeder diode 23 relative to the second constant-voltage power circuit 20S. The standby open-circuit switch 129 is closed as a result of the power switch 103 closing, the output contact 102a of the power relay closing and the first constant-voltage power circuit 10S generating the first output voltage Vif. Moreover, when the power switch 103 is opened, the arithmetic circuit section 121 starts to retreat and the standby open-circuit switch 129 is reset to an open circuit to de-energize the power relay.

That is to say, when the current limiting resistor is connected to the hold feeder diode in series and the output contact of the power relay is opened, the standby open-circuit switch is also opened.

Accordingly, when the output contact of the power relay is closed, power supply to the second constant-voltage power circuit is concentrated on the output contact side with no current limiting resistor. When the output contact of the power relay is open, the load on the second constant-voltage power circuit is relieved to suppress direct power supply from the on-vehicle battery, thus thinning a power wiring and reducing the capacity of a noise filter against the power line.

Moreover, in the on-vehicle electronic control apparatus according to Embodiment 1, the second constant-voltage power circuit 20S is powered from the on-vehicle battery 101 through the output contact 102a of the power relay and the feeder diode 21 and is powered from the on-vehicle battery 101 through the power switch 103 and the advance feeder diode 22.

That is to say, the second constant-voltage power circuit is powered from the on-vehicle battery immediately after the power switch is closed. The first constant-voltage power circuit is powered from the on-vehicle battery through the output contact of the power relay in response to the power switch.

Thus, before the applied voltage of the input/output interface to the microprocessor reaches a predetermined value, the applied voltage to the arithmetic circuit section is established to prevent the microprocessor from malfunctioning.

In the case that the second constant-voltage power circuit is directly powered from the on-vehicle battery through the hold feeder diode, the microprocessor can be prevented from abnormal operation when the power switch is closed due to a break in the power line of the direct feeder circuit, or contact failure of a wiring connector under no direct power supply.

Moreover, in the on-vehicle electronic control apparatus according to Embodiment 1, the microprocessor 120A cooperates with the combined control circuit section 130A connected to the microprocessor in series, and the combined control circuit section transfer-connects input/output signals from/to added on-vehicle sensor groups 104b, 105b and on-vehicle electrical load group 106b to the microprocessor 120A. The constant-voltage power circuit 110A further includes the third constant-voltage power circuit 30D. The third constant-voltage power circuit 30D is powered from the on-vehicle battery 101 through at least the output contact 102a of the power relay to generate the third output voltage Vsb. The third output voltage Vsb is applied to the monitor control circuit section 131A and the auxiliary RAM memory 133 provided in the combined control circuit section 130A. The fourth constant-voltage power circuit 40D supplies power to the auxiliary RAM memory 133 through the auxiliary feeder circuit 42 that is a diode or a resistive element.

That is to say, in concurrent use of the combined control circuit section, when the third constant-voltage power circuit is powered from the on-vehicle battery through the output contact of the power relay or when the third constant-voltage power circuit is directly powered from the on-vehicle battery and the combined control circuit section has the backup memory, the third constant-voltage power circuit is powered from the fourth constant-voltage power circuit through the auxiliary feeder circuit that is a diode or a resistive element even when the power switch is open.

Accordingly, the power consumption of the on-vehicle battery is suppressed under a state where the power switch is open, and the fourth constant-voltage power circuit is used as it is, thus achieving stable power supply of micro current to backup memories on the microprocessor side and the combined control circuit section side.

Additionally, in the on-vehicle electronic control apparatus according to Embodiment 1, the microprocessor 120A or the combined control circuit section 130A cooperating with the microprocessor includes the first or second multi-channel A-D converters 124, 134 for converting analog signals entered from the analog sensors 104a, 104b that are a part of the vehicle sensor group into digital signals. The constant-voltage power circuit 110A includes the fifth constant-voltage power circuit 50D that responds to the closing operation of the output contact 102a of the power relay to supply the fifth output voltage Vad to the first or second multi-channel AD converters 124, 134. The first constant-voltage power circuit 10S generates the first output voltage Vif of large capacity but low precision, while the fifth constant-voltage power circuit 50D generates the fifth output voltage Vad of small capacity but higher precision even when the voltage is the same as the first output voltage Vif.

That is to say, the fifth constant-voltage power circuit for the multi-channel A-D converter that requires a voltage of small capacity but high precision is separated from the first constant-voltage power circuit.

Accordingly, the output of the first constant-voltage power circuit may be one of large capacity but low precision, which achieves an inexpensive configuration as a whole. Particularly, the separated first constant-voltage power circuit, using a switching power supply of a type of controlling the current-carrying duty of a switching element, provides low loss and size and cost reductions although voltage ripple exists. The fifth constant-voltage power circuit, using a dropper power supply of a type of continuously controlling a conduction state of a switching element, provides highly precise output voltage.

Embodiment 2

(1) Description of Configuration

Figure 3:
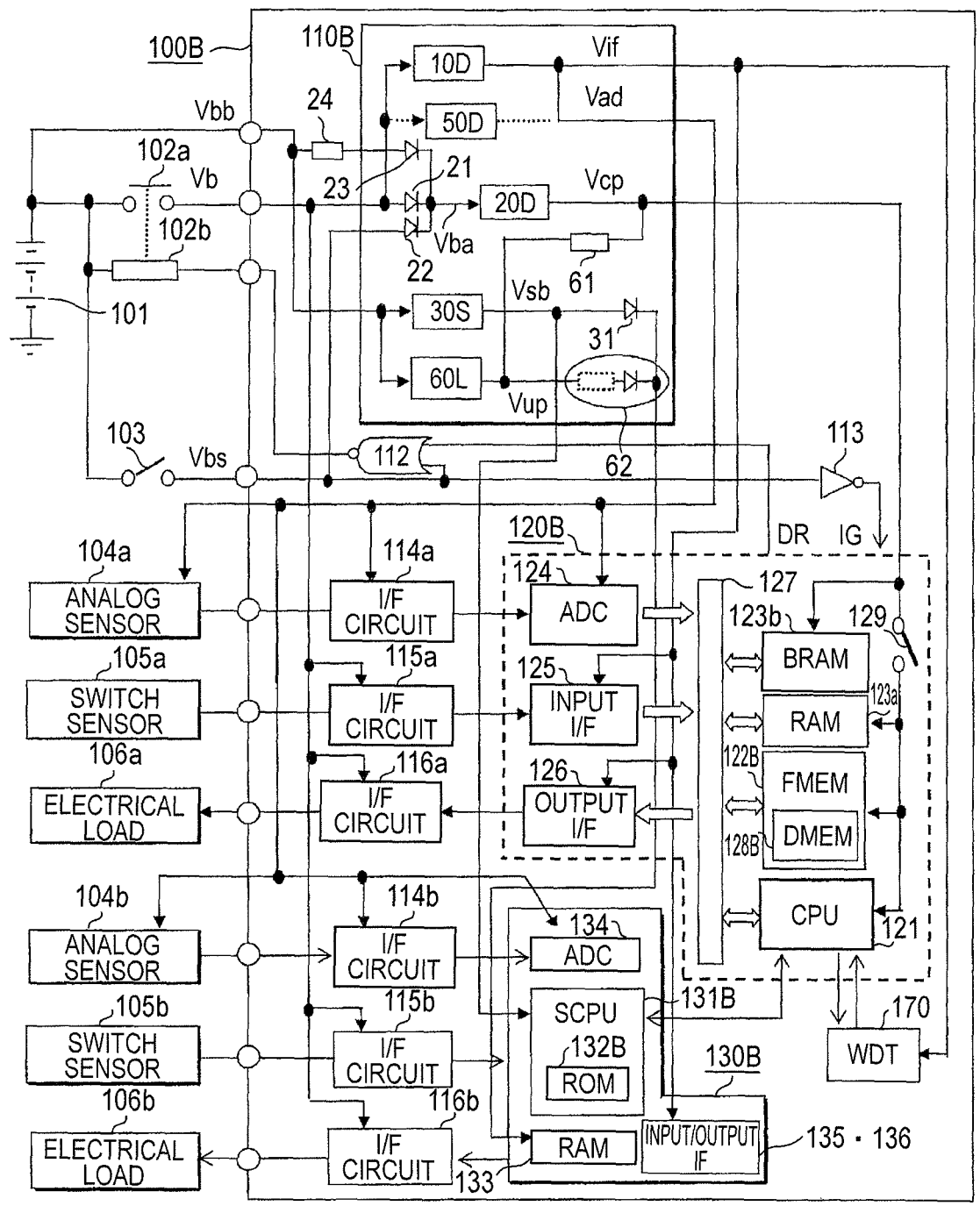
FIG. 3 is a total circuit block diagram of an on-vehicle electronic control apparatus according to Embodiment 2 of the present invention.
Figure 4:
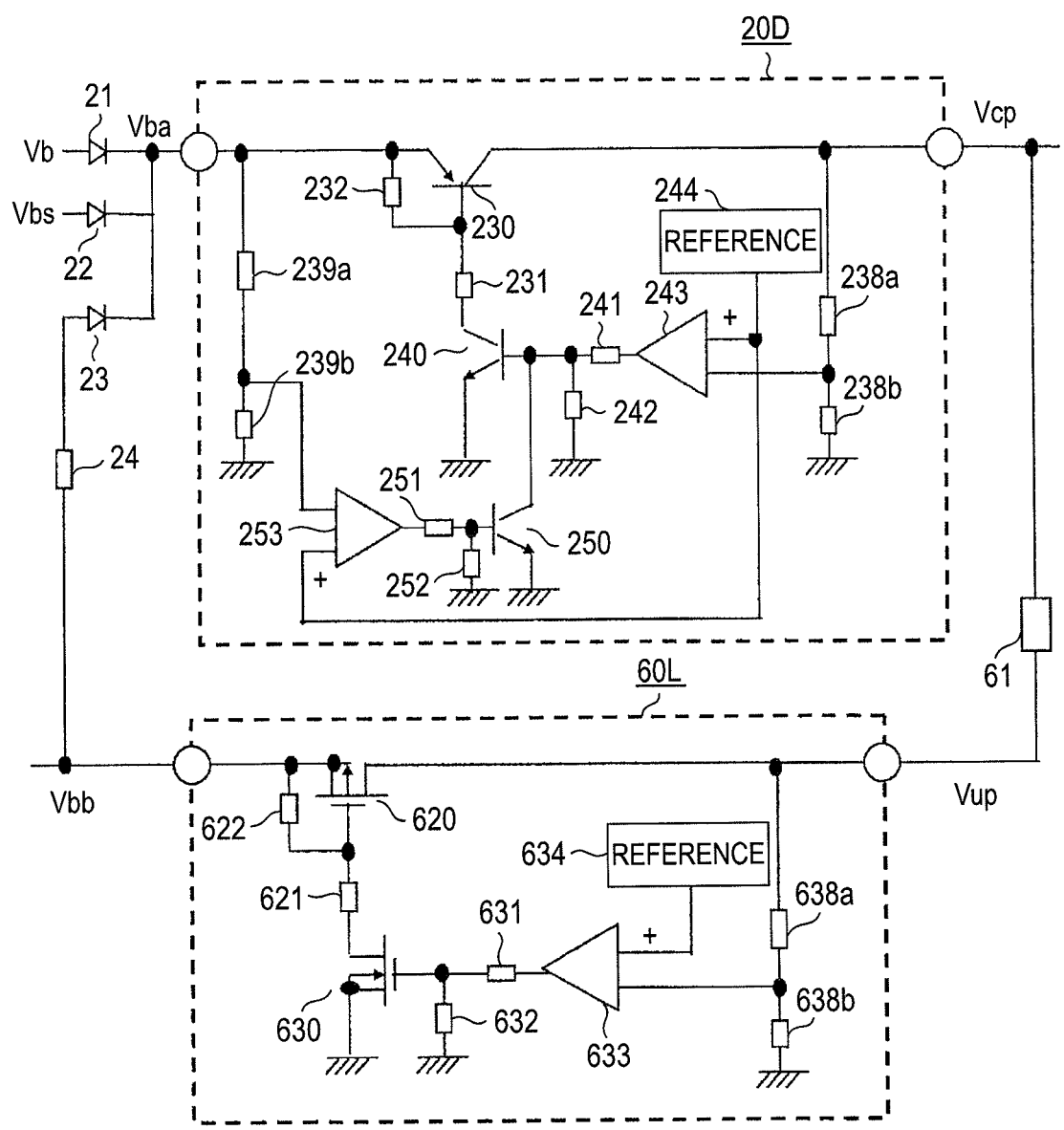
FIG. 4 is a detailed circuit diagram of a partial constant-voltage power circuit according to Embodiment 2 of the present invention.

Referring to FIG. 3 showing a total circuit block diagram and FIG. 4 showing a detailed circuit diagram of a partial constant-voltage power circuit, an on-vehicle electronic control apparatus according to Embodiment 2 of the present invention will be described with an emphasis on differences from FIGS. 1 and 2. Note that in FIGS. 3 and 4, the same reference numeral/character as those in FIGS. 1 and 2 shows the same or equivalent portion.

In FIG. 3, to an on-vehicle electronic control apparatus 100B, the on-vehicle battery 101, the output contact 102a and the exciting coil 102b of the power relay, the power switch 103, the first analog sensor 104a, the second analog sensor 104b, the first switch sensor 105a, the second switch sensor 105b, a first on-vehicle electrical load group 106a, and a second on-vehicle electrical load group 106b are connected in the same way as in FIG. 1, and the main power voltage Vb, the advance power voltage Vbs, and the hold power voltage Vbb are provided.

A microprocessor 120B includes, in the same way as the microprocessor 120A, the arithmetic circuit section 121, a non-volatile program memory 122B, the RAM memories 123a, 123b partial region of which is used as a backup memory 123b, the first multi-channel A-D converter 124, the input interface circuit 125, the output interface circuit 126, and a standby open-circuit switch 129. The non-volatile program memory 122B uses a flash memory, a partial region of which is used as a non-volatile data memory 128B.

A combined control circuit section 130B includes, in the same way as the combined control circuit section 130A, a monitor control circuit section 131B, the auxiliary RAM memory 133, the second multi-channel A-D converter 134, the input interface circuit 135, and the output interface circuit 136. A sub CPU cooperating with an auxiliary program memory 132B is used in the monitor control circuit section 131B. The sub CPU 131B is a low power consumption type microprocessor capable of vehicle monitoring or clocking operation by performing intermittent operation under a parking state with the power switch 103 open.

A constant-voltage power circuit 110B generates plural stabilized output voltages and supplies power to each part in the on-vehicle electronic control apparatus 100B, in the same way as the constant-voltage power circuit 110A.

Note that a fifth constant-voltage power circuit 50D in FIG. 1 is omitted, and the first output voltage Vif is shared in place of a fifth output voltage Vad. Moreover, the first constant-voltage power circuit 10S in FIG. 1 uses an on-off control type constant-voltage power circuit of low precision and low power consumption, while a first constant-voltage power circuit 10D in FIG. 3 uses a linear control type constant-voltage power circuit of high precision, thus achieving a configuration suited to an on-vehicle electronic control apparatus with small number of inputs/outputs.

A second constant-voltage power circuit 20D is applied with the synthetic power voltage Vba obtained from the feeder diode 21, the advance feeder diode 22 and the hold feeder diode 23, in the same way as in FIG. 1. In FIG. 1, an on-off control type constant-voltage power circuit described in FIG. 2 is used, while in FIG. 3, a linear control type constant-voltage power circuit to be described later in FIG. 4 is used. This is because a load current of the second constant-voltage power circuit 20D in FIG. 3 is relatively low, and no excessive loss is caused. A third constant-voltage power circuit 30S is directly powered from the on-vehicle battery 101 and is powered to the sub CPU 131B even when the power switch 103 is open.

The sub CPU 131B is of low power consumption type; however, an on-off control type constant-voltage power circuit is used to alleviate a burden on the on-vehicle battery 101 during parking.

The fourth constant-voltage power circuit 60L is directly powered from the on-vehicle battery 101 and is connected with an output terminal of the second constant-voltage power circuit 20D through the serial resistor 61, in the same way as in FIG. 1.

However, the constant-voltage power circuit in FIG. 1 is a linear control type using a junction type transistor as shown in FIG. 2, while the constant-voltage power circuit in FIG. 3 is of a linear control type using a field effect transistor as described later in FIG. 4.

Referring next to FIG. 4, the detailed circuits of the second constant-voltage power circuit 20D in FIG. 3 and the fourth constant-voltage power circuit 60L in FIG. 4 will be described below.

In FIG. 4, the second constant-voltage power circuit 20D that operates with the synthetic power voltage Vba composed of the feeder diode 21, the advance feeder diode 22 and the hold feeder diode 23 as an input voltage, includes the switching element 230, which is a PNP type junction transistor, for example. The synthetic power voltage Vba is applied to an emitter terminal of the switching element 230, and a collector terminal thereof is connected to an output terminal generating the second output voltage Vcp. A base terminal of the switching element 230 is connected to a ground circuit through a serial circuit of a drive resistor 231 and a previous-stage transistor 240 that is an NPN type junction transistor, for example. Moreover, an open-circuit ballast resistor 232 is connected between the emitter terminal and the base terminal, and voltage dividing resistors 238a, 238b are connected in series between the collector terminal and the ground circuit to monitor a second output voltage Vcp. An open-circuit ballast resistor 242 is connected between the base terminal and the emitter terminal of the previous-stage transistor 240, and an output voltage of a comparison amplifier 243 is applied to the base terminal through a drive resistor 241.

The comparison amplifier 243 generates an analog signal voltage in response to a deviation integral value between a reference voltage 244 generated by a band gap cell and a voltage in proportion to the second output voltage Vcp by voltage dividing resistors 238a, 238b, for example, and performs linearly control of a conduction state so that a base current of the previous-stage transistor 240 is increased when the second output voltage Vcp is lower than a predetermined voltage or the base current of the previous-stage transistor 240 is decreased when the second output voltage Vcp is higher than the predetermined voltage. A cutoff control transistor 250 that is an NPN type junction transistor, for example, is connected between the base terminal and the emitter terminal of the previous-stage transistor 240. An open-circuit ballast resistor 252 is connected between the base terminal and the emitter terminal of the cutoff control transistor 250, and an output voltage of a comparison amplifier 253 is applied to the base terminal through a drive resistor 251.

The comparison amplifier 253 compares voltage magnitude between a reference voltage 244 and the voltage in proportion to a synthetic power voltage Vba by voltage dividing resistors 239a, 239b and cuts off a cutoff control transistor 250 when the synthetic power voltage Vba is higher than a predetermined voltage and conducts the cutoff control transistor 250, and cuts off the switching element 230 when the synthetic power voltage Vba is lower than the predetermined voltage.

Thus, under such a low voltage state that the microprocessor 120B becomes inoperative, wasteful power supply is stopped by opening the switching element 230.

The fourth constant-voltage power circuit 60L to which the hold power voltage Vbb is applied includes a switching element 620 that is a P-MOS type field effect transistor, for example. The hold power voltage Vbb is applied to the source terminal of the switching element 620 and the drain terminal thereof is connected to the output terminal that generates the fourth output voltage Vup and is connected to the output terminal of the second constant-voltage power circuit 20D through the serial resistor 61. A voltage dividing resistor 622 is connected in parallel between the gate terminal and the source terminal of the switching element 620. The gate terminal is connected to a ground circuit through a drive resistor 621 and a previous-stage transistor 630 that is an N-MOS type field effect transistor and, when the previous-stage transistor 630 conducts, the switching element 620 also conducts. A voltage dividing resistor 632 is connected between the gate terminal and the source terminal of the previous-stage transistor 630, and the output voltage of a comparison amplifier 633 is applied to the gate terminal through a drive resistor 631.

The comparison amplifier 633 generates an analog signal voltage in response to a deviation integral value between a reference voltage 634 generated by a band gap cell and a voltage in proportion to the fourth output voltage Vup by voltage dividing resistors 638a, 638b, for example, and performs linearly control of a conduction state so that a gate voltage of the previous-stage transistor 630 is increased when the fourth output voltage Vup is lower than a predetermined voltage or the gate voltage of the previous-stage transistor 630 is decreased when the fourth output voltage Vup is higher than the predetermined voltage.

Returning to FIG. 3, when the auxiliary RAM memory 133 is used as a backup memory, power is supplied to the auxiliary RAM memory 133 from a parallel output between a parallel feeder diode 31 connected to the third constant-voltage power circuit 30S and an auxiliary feeder circuit 62 that is a diode or a resistive element connected to the fourth constant-voltage power circuit 60L. Thus, even when the power voltage of the on-vehicle battery 101 drops and the sub CPU 131B becomes inoperative, power supply to the auxiliary RAM memory 133 can be continued by the power supply from the fourth constant-voltage power circuit 60L when the power voltage drops to a minimum assured voltage corresponding to the minimum hold voltage of the auxiliary RAM memory 133. Accordingly, in the same way as in the cutoff control transistor 250 in FIG. 4, when the power voltage excessively drops, generation of the output of the third constant-voltage power circuit 30S is stopped, so that wasteful power supply to the sub CPU 131B may be stopped.

(2) Description of Action and Operation

Referring next to FIGS. 3 and 4, the action and operation of the on-vehicle electronic control apparatus according to Embodiment 2 of the present invention configured as described above will be described in detail below.

First, the outline of the whole control operation is as follows: when the power switch 103 is closed, the exciting coil 102b of the power relay is energized through the logical OR inversion output circuit 112, the output contact 102a is closed, and a main power voltage Vb is applied from the on-vehicle battery 101. The constant-voltage power circuit 110B generates first output voltage in addition to the second to fourth output voltages, so that the arithmetic circuit section 121 and the combined control circuit section 130B start to operate. The arithmetic circuit section 121 generates a control output signal in response to operating states of the first and second analog sensors 104a, 104b and the first and second switch sensors 105a, 105b, which are among the on-vehicle sensor group, as well as a control program stored in the non-volatile program memory 122B to drivingly control the first and second on-vehicle electrical load groups 106a, 106b. The combined control circuit section 130B transmits operating states of the second analog sensor 104b and the second switch sensor 105b to the microprocessor 120B as monitor signals, and receives a control signal generated by the microprocessor 120B to drive the second on-vehicle electrical load group 106b.

The combined control circuit section 130B mutually monitors an operating state during operation of the microprocessor 120B and, under such a parking state that the microprocessor 120B is stopping the operation with the power switch 103 open, the sub CPU 131B singly operates and measures elapsed time during parking or regularly monitors the operating state of a part of the on-vehicle sensors.

Particular sensors to be monitored during parking are temporarily powered by a selected feeder circuit (not shown), signals of which are entered into the sub CPU 131B.

Various types of failure occurrence information occurring during the operation of the arithmetic circuit section 121 and learning storage information are stored in the backup memory 123b. The backup memory 123b retains storage contents by the fourth output voltage Vup obtained by stepping down a hold power voltage Vbb even when the output contact 102a of the power relay is open. The important information stored in the auxiliary RAM memory 133 of the combined control circuit section 130B is transferred to the backup memory 123b on the microprocessor 120B side during the operation, and usually the battery backup for the auxiliary RAM memory 133 is not required. However, the information measured before operation stop, such as elapsed time information regularly stored during parking or the operating state of a particular sensor, can be stored even when the sub CPU 131B stops because the auxiliary RAM memory 133 is powered from the fourth constant-voltage power circuit 60L through the auxiliary feeder circuit 62 that is a diode or a resistive element. In the event that the on-vehicle battery 101 has an excessive voltage drop or the output terminal is opened for replacement, the storage information in the backup memory 123b and the auxiliary RAM memory 133 disappears; therefore, when the power switch 103 is opened, a part of important data stored in the backup memory 123b is stored in the non-volatile data memory 128B which is a partial region of the non-volatile program memory 122B during a delayed feeding period until the output contact 102a of the power relay is opened.

The sharing of roles of the second and fourth constant-voltage power circuits 20D, 60L, roles of the serial resistor 61, and the sharing of roles of the feeder diode 21, the advance feeder diode 22, the hold feeder diode 23, and the current limiting resistor 24 are the same as in FIG. 1. First, when the power switch 103 is open, the power relay is de-energized and the output contact 102a thereof is open, the first (fifth) constant-voltage power circuit 10S (50D) stops the operation, and the first (fifth) output voltage Vif (Vad) does not occur. As the result, a standby open-circuit switch 129 is in an open-circuit state, and the microprocessor 120B is under such a good state that a hold current Ih appropriate to maintain an operating state of the backup memory 123b, for example, approximately 1 mA is supplied.

The fourth constant-voltage power circuit 60L generates the fourth output voltage Vup of DC 3.3 V±0.3 V, for example, and supplies power to the backup memory 123b through the serial resistor 61 of a resistance value R61=100Ω, for example. Accordingly, even when the hold feeder voltage Vbb drops to a minimum assured voltage Vbmin=4.3 V, for example, due to an excessive voltage drop of the on-vehicle battery 101, a minimum hold voltage Vkp (for example, DC 2.5 V) of the backup memory 123b can be ensured.

On the other hand, to the second constant-voltage power circuit 20D, the hold power voltage Vbb is applied through the current limiting resistor 24 of a resistor R24=100Ω and the hold feeder diode 23; however, when the output voltage of the on-vehicle battery 101 excessively drops, the switching element 230 in FIG. 4 is opened and a hold current Ih cannot be supplied to the backup memory 123b.

When the power voltage of the on-vehicle battery 101 is at a normal low-voltage level of DC 8.0 V or higher, for example, the second constant-voltage power circuit 20S also operates properly and supplies power to the backup memory 123b in cooperation with the second and fourth constant-voltage power circuits 20S, 60L; however, this is actually not expected to obtain an output of the second constant-voltage power circuit 20D. It is the role of the hold feeder diode 23 to maintain the second constant-voltage power circuit 20D in an operating state.

Therefore, the fourth constant-voltage power circuit 60L retains storage information of the backup memory 123b even when the output voltage of the on-vehicle battery 101 is an excessive lower voltage than a normal minimum voltage.

Next, immediately after the power switch 103 is closed, first, the advance feeder diode 22 supplies power to the second constant-voltage power circuit 20D; however, the second constant-voltage power circuit 20D is under the operation by the hold feeder diode 23, and the advance feeder diode 22 is usually unnecessary. However, in the event that a direct feeder line from the on-vehicle battery 101 is broken or hold power supply is not performed due to failed contact of an input terminal of the hold power voltage Vbb, before the output contact 102a of the power relay is closed and the first (fifth) constant-voltage power circuit 10D (50D) generates the first (fifth) output voltage Vif (Vad), the second constant-voltage power circuit 20D generates the second output voltage Vcp to prevent the microprocessor 120B from malfunctioning. When the power switch 103 is closed and the output contact 102a of the power relay is closed, the first (fifth) output voltage Vif (Vad) is generated in addition to the third and fourth output voltages Vsb, Vup generated in advance, and, as a result of generation of the first output voltage Vif, the standby open-circuit switch 129 is closed. As the result, the output current of the second constant-voltage power circuit 20D rapidly increases to 300 mA, for example; however, since the output contact 102a is closed before the output current rapidly increases, the current running through the current limiting resistor 24 is a micro value obtained by dividing a voltage deviation based on a difference in a voltage drop of the feeder line by a resistance value R24 of the current limiting resistor 24.

When a maximum differential value ΔVmax (for example, 3.6−3.0=0.6 V) develops between a variation maximum (for example, 3.3+0.3=3.6 V) of the fourth output voltage Vup and a variation minimum (for example, 3.3−0.3=3.0 V) of the second output voltage Vcp, the current running through the fourth constant-voltage power circuit 60L becomes ΔVmax/R61, where R61 is a resistance value of a serial resistor 61. When this is 0.1 KΩ, for example, the maximum current becomes 0.6 V/0.1 KΩ=6 mA, for example. Thus, it is sufficient when an allowable output current Imax of the fourth constant-voltage power circuit 60L is, at most, 10 mA.

Next, immediately after the power switch 103 is opened, the exciting coil 102b of the power relay maintains an energizing state with a power hold command signal DR generated by the microprocessor 120B and the logical AND circuit 122. A part of the data stored in the backup memory 123b is transferred and stored in the non-volatile data memory 128B and successively when the microprocessor 120B stops the operation, the standby open-circuit switch 129 is opened, the power hold command signal DR stops, and the power relay is de-energized.

When the output contact 102a of the power relay is opened, the first (fifth) constant-voltage power circuit 10D (50D) stops the operation; however, for the second constant-voltage power circuit 20D, power supply is continued by the current limiting resistor 24 and the hold feeder diode 23.

However, since the standby open-circuit switch 129 has already been opened, the current running through the current limiting resistor 24 is minor.

In FIG. 4 showing a concrete circuit configuration of the second and the fourth constant-voltage power circuits 20D, 60L, the second constant-voltage power circuit 20D is a linear control type constant-voltage power circuit using a PNP junction type transistor, generates a second constant-voltage output Vcp against wide-ranging power voltage fluctuations but performs forced cut-off in a low-voltage region.

An on-off control type constant-voltage power circuit that provides low power consumption may be used as the switching element 230 in the same way as in FIG. 2.

The fourth constant-voltage power circuit 60L is a linear control type constant-voltage power circuit using a P-MOS field effect transistor, thus achieving a small-sized and low-cost configuration as a light-load constant-voltage power circuit, and achieving a highly precise constant-voltage output because of no ripple fluctuations accompanied with on-off control. However, power supply to the backup memory 123b requires no particular high-precision output voltage. Moreover, the PNP junction type transistor may be used as the switching element 620 as shown in FIG. 2.

In the case that as the sub CPU 131B, a microprocessor including a standby open-circuit switch 129 is used in the same way as the microprocessor 120B, a third output voltage Vsb with a third constant-voltage power circuit 30S is applied to the sub CPU 131B and the auxiliary RAM memory 133 in common, and a resistive element equivalent to the serial resistor 61 is connected as an auxiliary feeder circuit 62 to the fourth constant-voltage power circuit 60L.

Preferably, a short-circuit of the parallel feeder diode 31 provided at the output of the third constant-voltage power circuit 30S is omitted and a diode for protection against a wire break or ground is connected on the feeder circuit side from the on-vehicle battery 101.

(3) Features of Embodiment 2

As obvious from the above description, the on-vehicle electronic control apparatus according to Embodiment 2 of the present invention has the following features:

The on-vehicle electronic control apparatus according to Embodiment 2 of the present invention includes: the microprocessor 120B that drivingly controls the on-vehicle electrical load group 106a in response to operating states of the on-vehicle sensor groups 104a, 105a and the contents of a control program stored in the non-volatile program memory 122B, and the constant-voltage power circuit 110B powered from the on-vehicle battery 101 and generating plural types of stabilized output voltages, wherein the microprocessor 120B includes the arithmetic circuit section 121 cooperating with the non-volatile program memory 122B; volatile RAM memories 123a, 123b with at least a partial region or all regions as the backup memory 123b; input/output interface circuits 125, 126; and a standby open-circuit switch 129 that cuts off a feeder circuit against circuits other than the backup memory 123b at standby, and the constant-voltage power circuit 110B includes the first, second and fourth constant-voltage power circuits powered from the on-vehicle battery 101 and supplying a stabilized output voltage to the microprocessor 120B.

The first constant-voltage power circuit 10D is powered from the on-vehicle battery 101 through the output contact 102a of the power relay energized when the power switch 103 is closed, and de-energized at an interval of a predetermined delay time when the power switch is opened, so as to generate the first output voltage Vif. The first output voltage Vif is applied to the input/output interface circuits 125, 126. The second constant-voltage power circuit 20D is powered from the vehicle battery 101 through the output contact 102a of at least the power relay to generate a second output voltage Vcp. The second output voltage Vcp is applied to the arithmetic circuit section 121 provided in the microprocessor 120B, the non-volatile program memory 122B, the RAM memory 123a and the backup memory 123b. The fourth constant-voltage power circuit 60L is directly powered from the on-vehicle battery 101 to generate the fourth output voltage Vup and is connected with an output terminal of the second constant-voltage power circuit 20D through the serial resistor 61.

Moreover, the microprocessor 120B cooperates with the combined control circuit section 130B connected to the microprocessor in series, and the combined control circuit section transfer-connects input/output signals from/to added on-vehicle sensor groups 104b, 105b and on-vehicle electrical load group 106b to the microprocessor 120B. The constant-voltage power circuit 110B further includes the third constant-voltage power circuit 30S. The third constant-voltage power circuit 30S is directly powered from the on-vehicle battery 101 to generate the third output voltage Vsb. The third output voltage Vsb is applied to the monitor control circuit section 131B and the auxiliary RAM memory 133 provided in the combined control circuit section 130B. The fourth constant-voltage power circuit 60L supplies power to the auxiliary RAM memory 133 through the auxiliary feeder circuit 62 that is a diode or a resistive element.

That is to say, in the on-vehicle electronic control apparatus according to Embodiment 2, in concurrent use of the combined control circuit section, when the third constant-voltage power circuit is powered from the on-vehicle battery through the output contact of the power relay or when the third constant-voltage power circuit is directly powered from the on-vehicle battery and the combined control circuit section has the backup memory, the third constant-voltage power circuit is powered from the fourth constant-voltage power circuit through the auxiliary feeder circuit that is a diode or a resistive element even when the power switch is open.

Accordingly, in the case that the third constant-voltage power circuit is always connected from the on-vehicle battery, using the sub CPU of low power consumption as a monitor control circuit section, the monitor control circuit section can be intermittently operated even when the power switch is open, and the fourth constant-voltage power circuit provides stable power supply of micro current to the backup memories on the microprocessor side and on the combined control circuit section side during operation stop.

Additionally, in the on-vehicle electronic control apparatus according to Embodiment 2, the microprocessor 120B or the combined control circuit section 130B cooperating with the microprocessor includes the first and second multi-channel A-D converters 124, 134 for converting analog signals entered from the analog sensors 104a, 104b that are a part of the on-vehicle sensor group into digital data. The first constant-voltage power circuit 10D generates a first output voltage Vif shared for either or both of input/output interface circuits 125, 126 and the first multi-channel AD converter 124 on the microprocessor 120B side or input/output interface circuits 135, 136 and the second multi-channel AD converter 134 on the combined control circuit section 130B side, and the first constant-voltage power circuit 10D provides a highly precise output voltage by a dropper power supply of a type of continuously controlling a conduction state of a switching element.

More specifically, a switch sensor performing on-off operations or the input/output interface circuits relative to electrical load and the multi-channel A-D converter for analog sensor share a first output voltage.

Accordingly, a power line for the microprocessor or the combined control circuit section is not required to be separated, thus simplifying a circuit configuration. Particularly, in the case that there is no major divergence between the current required for the interface circuit performing on-off operations and the current required for the multi-channel A-D converter, integration of the constant-voltage power circuits provides size and cost reductions.

Various modifications and alterations of this invention will be apparent to those skilled in the art without departing from the scope and spirit of this invention, and it should be understood that this is not limited to the illustrative embodiments set forth herein.

What is claimed is:

1. An on-vehicle electronic control apparatus comprising a microprocessor for drivingly controlling an electrical load group in response to operating states of on-vehicle sensor groups and contents of a control program stored in a non-volatile program memory, and a constant-voltage power circuit powered from an on-vehicle battery and generating a plurality of types of output voltages, wherein the microprocessor comprises: an arithmetic circuit section cooperating with the non-volatile program memory; a volatile RAM memory with at least a partial region as a backup memory; an input/output interface circuit; and a standby open-circuit switch that cuts off a feeder circuit against circuits other than the backup memory at standby, wherein the constant-voltage power circuit comprises a first, a second and a fourth constant-voltage power circuit powered from the on-vehicle battery and supplying a stabilized output voltage to the microprocessor, the first constant-voltage power circuit is powered from the on-vehicle battery through an output contact of a power relay energized when a power switch is closed, and de-energized at an interval of a predetermined delay time when the power switch is opened, to generate a first output voltage Vif, the first output voltage Vif is applied to the input/output interface circuit, the second constant-voltage power circuit is powered from the on-vehicle battery through the output contact of at least the power relay to generate a second output voltage Vcp, the second output voltage Vcp is applied to the arithmetic circuit section provided in the microprocessor, the non-volatile program memory, the RAM memory, and the backup memory, and the fourth constant-voltage power circuit is directly powered from the on-vehicle battery to generate a fourth output voltage Vup and is connected with an output terminal of the second constant-voltage power circuit through a serial resistor, and wherein a resistance value R of the serial resistor is defined as follows:

when the standby open-circuit switch is opened and the fourth output voltage Vup supplies power to the backup memory, an upper limit is regulated on that a predetermined hold current is supplied, and when the standby open-circuit switch is closed and power supply is performed in parallel to the second constant-voltage power circuit, a lower limit is regulated no that an upper limit of the current shunted to the fourth constant-voltage power circuit is less that or equal to the allowable current of the fourth constant-voltage power circuit.

2. The on-vehicle electronic control apparatus according to claim 1, wherein a resistance value R of the serial resistor is defined as follows: when the generated voltage of the on-vehicle battery is higher than or equal to a minimum assured voltage Vbmin≥Vup+Vd corresponding to a value obtained by adding a minimum voltage drop Vd of the fourth constant-voltage power circuit to the fourth output voltage Vup even when the power switch is opened and outputs of the first and second output voltages Vif, Vcp stop, an output voltage of higher than or equal to the minimum hold voltage Vkp of the backup memory is applied to the backup memory from the fourth constant-voltage power circuit, and a value of less than or equal to (Vup−Vkp)/Ikp is selected so that a current of higher than or equal to a predetermined hold current Ikp is supplied, and wherein when the first and second output voltages Vif, Vcp develop with the power switch closed and the standby open-circuit switch is closed, a resistance value R of the serial resistor is set at a value higher than or equal to ΔVmax/Imax so that an output current generated by the fourth constant-voltage power circuit is less than or equal to a predetermined allowable current Imax through the serial resistor when a maximum differential value ΔVmax occurs between a fluctuation maximum of the fourth output voltage Vup generated by the fourth constant-voltage power circuit and a fluctuation minimum of the second output voltage Vcp.

3. The on-vehicle electronic control apparatus according to claim 1, wherein the second constant-voltage power circuit is powered from the on-vehicle battery through the output contact and a feeder diode and is directly powered from the on-vehicle battery through a hold feeder diode and, even when the output contact is opened, the power supply to an input circuit section of the second constant-voltage power circuit is continued.

4. The on-vehicle electronic control apparatus according to claim 3, wherein a current limiting resistor is connected in series with a hold feeder diode relative to the second constant-voltage power circuit, the standby open-circuit switch is closed as a result of the power switch closing, the output contact of the power relay closing and the first constant-voltage power circuit generating the first output voltage Vif and wherein, when the power switch is opened, the arithmetic circuit section starts to retreat and the standby open-circuit switch is reset to an open circuit to de-energize the power relay.

5. The on-vehicle electronic control apparatus according to claim 3, wherein the second constant-voltage power circuit is powered from the on-vehicle battery through the output contact of the power relay and a feeder diode and is powered from the on-vehicle battery through the power switch and an advance feeder diode.

6. The on-vehicle electronic control apparatus according to claim 1, wherein the microprocessor cooperates with the combined control circuit section connected to the microprocessor in series, the combined control circuit section transfer-connects input/output signals from/to an added on-vehicle sensor group and an on-vehicle electrical load group to the microprocessor, and the constant-voltage power circuit further comprises a third constant-voltage power circuit, wherein the third constant-voltage power circuit is powered from the on-vehicle battery through at least the output contact of the power relay or is directly powered from the on-vehicle battery to generate a third output voltage Vsb, wherein the third output voltage Vsb is applied to a monitor control circuit section and an auxiliary RAM memory provided in the combined control circuit section, and wherein the fourth constant-voltage power circuit supplies power to the auxiliary RAM memory through an auxiliary feeder circuit that is a diode or a resistive element.

7. The on-vehicle electronic control apparatus according to claim 6, wherein the microprocessor or the combined control circuit section cooperating with the microprocessor comprises a first or a second multi-channel A-D converter for converting an analog signal entered from an analog sensor that is a part of the on-vehicle sensor group into digital data, wherein the constant-voltage power circuit comprises the fifth constant-voltage power circuit that responds to the closing operation of the output contact of the power relay to supply a fifth output voltage to the first or the second multi-channel A-D converter, and wherein the first constant-voltage power circuit generates the first output voltage of large capacity but low precision, while the fifth constant-voltage power circuit generates the fifth output voltage of small capacity and higher precision even when the voltage is the same as the first output voltage.

8. The on-vehicle electronic control apparatus according to claim 6, wherein the microprocessor or the combined control circuit section cooperating with the microprocessor comprises a first or a second multi-channel A-D converter for converting an analog signal entered from an analog sensor that is a part of the on-vehicle sensor group into digital data, wherein the first constant-voltage power circuit generates a first output voltage Vif, Vad shared for either or both of input/output interface circuits and a first multi-channel AD converter on the microprocessor side or input/output interface circuits and a second multi-channel AD converter on the combined control circuit section side, and wherein the first constant-voltage power circuit provides a highly precise output voltage by a dropper power supply of a type of continuously controlling a conduction state of a switching element.

\* \* \* \* \*